United States Patent [19]

Oshima et al.

[11] Patent Number: 5,780,548
[45] Date of Patent: Jul. 14, 1998

[54] POLYPHENYLENE ETHER RESIN COMPOSITION

[75] Inventors: Akifumi Oshima, Utsunomiya; Hiromi Ishida; Toshihiko Shinohara, both of Moka, all of Japan

[73] Assignee: General Electric Company, Pittsfield, Mass.

[21] Appl. No.: 743,695

[22] Filed: Nov. 6, 1996

[30] Foreign Application Priority Data

Nov. 6, 1995 [JP] Japan ............................ 7-311559

[51] Int. Cl.$^6$ ..................... C08G 63/00; C08G 65/38; C08L 51/00
[52] U.S. Cl. ................... 525/63; 525/418; 525/905
[58] Field of Search .................... 525/63, 418, 905

[56] References Cited

U.S. PATENT DOCUMENTS

| | | | |
|---|---|---|---|
| 4,806,588 | 2/1989 | Fujimoto et al. | 524/505 |
| 5,011,889 | 4/1991 | Hamersma et al. | 525/133 |
| 5,019,615 | 5/1991 | Mizuno et al. | 524/100 |
| 5,039,781 | 8/1991 | Neugebauer et al. | 528/216 |
| 5,049,599 | 9/1991 | Steirt et al. | 524/80 |
| 5,073,620 | 12/1991 | Sanada et al. | 525/68 |
| 5,084,496 | 1/1992 | Ishida et al. | 524/127 |
| 5,084,512 | 1/1992 | Morioka. | |
| 5,112,914 | 5/1992 | Mizuno et al. | 525/134 |
| 5,159,015 | 10/1992 | Hamersma et al. | 525/68 |
| 5,159,018 | 10/1992 | Nishio et al. | 525/132 |
| 5,162,440 | 11/1992 | Akkapeddi et al. | 525/149 |
| 5,165,990 | 11/1992 | Nakano | 428/297.4 |
| 5,175,211 | 12/1992 | Sanada | 525/66 |
| 5,219,940 | 6/1993 | Nakano | 525/133 |
| 5,270,386 | 12/1993 | Kaughner | 525/66 |
| 5,304,593 | 4/1994 | Nishio et al. | 525/451 |
| 5,336,732 | 8/1994 | Samuels | 525/397 |
| 5,391,611 | 2/1995 | Funayama et al. | 524/508 |
| 5,405,902 | 4/1995 | Nishio | 525/64 |
| 5,539,030 | 7/1996 | Laughner | 524/141 |
| 5,543,448 | 8/1996 | Laughner | 524/109 |

FOREIGN PATENT DOCUMENTS

| | | |
|---|---|---|
| 0461 422 A2 | 5/1991 | European Pat. Off. . |
| 0 593 054 A2 | 10/1993 | European Pat. Off. . |
| 42 09 283 A1 | 9/1993 | Germany . |

*Primary Examiner*—Jeffrey C. Mullis

[57] ABSTRACT

Resin compositions are provided with improved compatibility between polyphenylene ether resin and thermoplastic polyester resin from which molded articles with high mechanical strength, especially impact resistance, can be obtained.

21 Claims, 1 Drawing Sheet

POLYPHENYLENE ETHER RESIN COMPOSITION

FIELD OF THE INVENTION

The present invention concerns a resin composition containing polyphenylene (sometimes abbreviated as PPE hereinbelow) and polyester resin (sometimes abbreviated as PE hereinbelow).

BRIEF DESCRIPTION OF THE RELATED ART

PPE resin is heat resistant, and it has good mechanical strength, electrical properties, dimensional stability, and the like. However, it is susceptible to attack from aromatic hydrocarbon solvents such as benzene and halogenohydrocarbon solvents such as trichloroethane. Since PPE has poor moldability, PPE used alone has not found much use in molded articles. Blending polystyrene resin with PPE resin has therefore been proposed as a method for improving PPE's moldability. While this method does improve moldability, the resultant resin blends have poor solvents.

Numerous alloys of PPE resin and polyamide resin have been proposed for the purpose of improving both solvent resistance and moldability (for example, Japan Examined Patent Application Kokoku No. Sho 45-997), but PPE-polyamide alloys lose mechanical strength, dimensional stability, and the like by absorbing moisture.

Other inventors have considered adding thermoplastic polyester resins to PPE in order to improve the later's moldability and solvent resistance. However, PPE and polyester resins have poor compatibility, and molded articles made from them have low mechanical strength. The addition of various compatibilizers was proposed to remedy this situation.

For example, it has been claimed that resin compositions providing molded articles that have good flexural elasticity, heat resistance, moldability, and water resistance can be obtained by adding compounds containing at least one from among carboxyl groups, acid anhydride groups, acid amide groups, imide groups, carboxylic acid ester groups, epoxy groups, amino groups, and hydroxyl groups (Kokoku No. Sho 63-350).

It has also been proposed to obtain resin compositions providing molded articles that have excellent appearance, impact resistance, moldability, dimensional stability, and chemical resistance by adding a bifunctional epoxy compound (Kokoku No. Sho 63-39958).

It is also known to improve the dispersion of PPE resin and polyester by adding a polymer obtained by reacting polyester and PPE with epoxy groups (Kokoku No. Sho 63-125569).

The object of the present invention is to provide a resin composition in which the compatibility of PPE resin and thermoplastic polyester resin is improved and which provides molded articles with high mechanical strength, especially high impact resistance.

SUMMARY OF THE INVENTION

As a result of intensive studies aimed at achieving this object, the present inventors discovered that specific compounds that are selectively reactive with PPE resin, specific compounds that are selectively reactive with thermoplastic polyester resin, and specific organic peroxides, when used in combination, act effectively as a compatibilizing agent, compatibilizing both resins well and causing the mechanical strength of molded articles made from them to be improved.

Thus, the resin composition of the present invention contains (A) 5 to 90 parts by weight of polyphenylene ether resin and (B) 95 to 10 parts by weight of thermoplastic polyester resin, the composition also containing per total 100 parts of (A) and (B), (C) 0.01 to 30 parts by weight of a compound simultaneously having
  (a) a residue of a compound selected from among maleic acid esters, maleimide, maleinamic acid esters, and their derivatives and
  (b) a residue of a compound selected from among oxazoline, oxazine, oxazolone, oxazinone, and their derivatives and (D) 0.01 to 3 percent by weight of an organic peroxide which has a half life of one minute at temperatures ranging from 100° to 270° C.

DETAILED DESCRIPTION OF THE INVENTION

Figure 1:
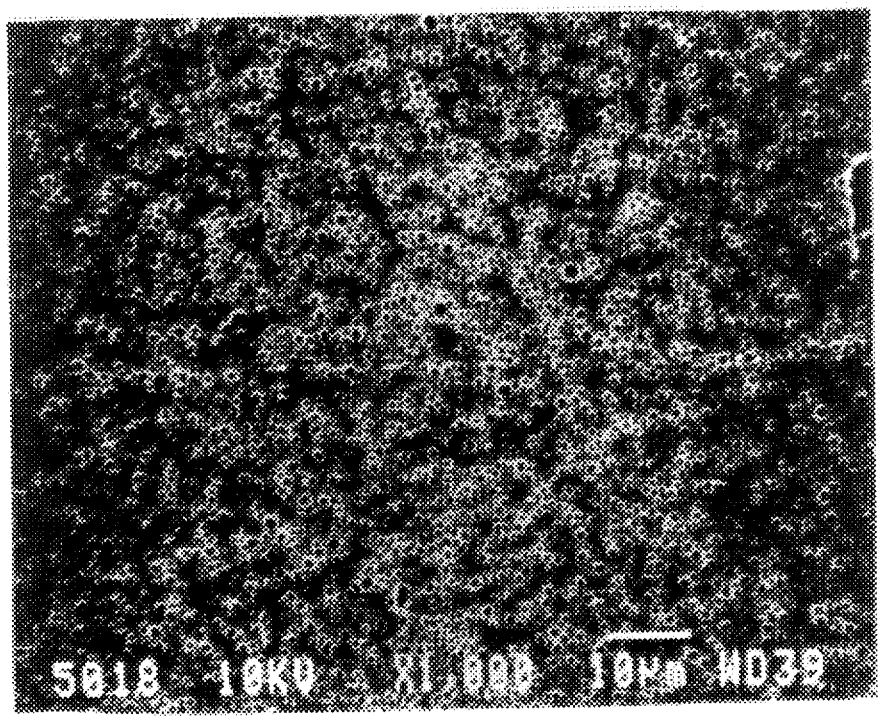
FIG. 1 is a scanning electron micrograph of the particle structure on a cross-section of a molding obtained in Working Example 7.
Figure 2:
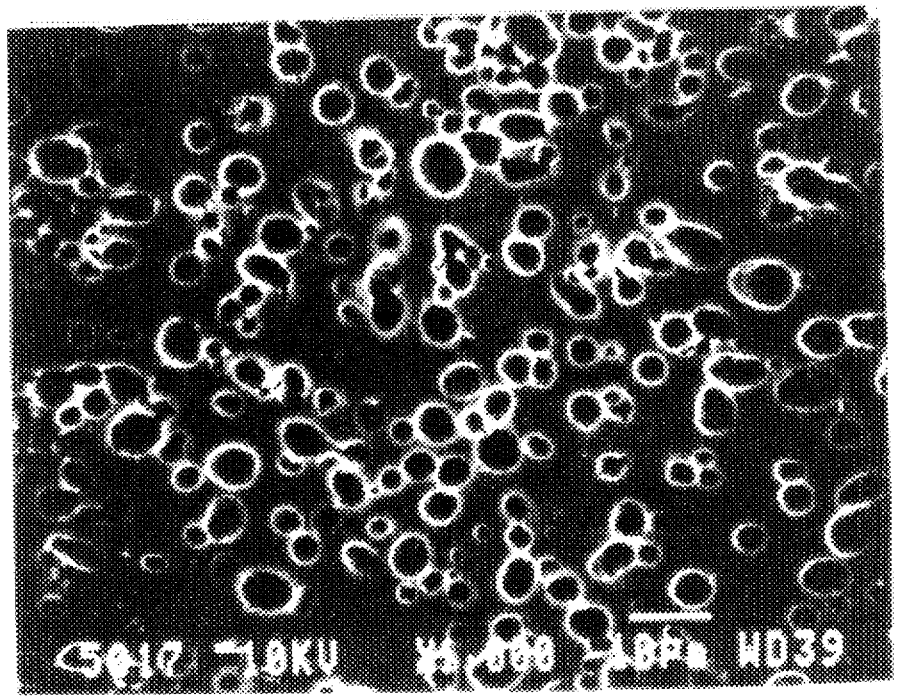
FIG. 2 is a scanning electron micrograph of the particle structure on a cross-section of a molding obtained in Comparative Example 5.

PPE resins known in the art may be used as the PPE resin (A), for example, homopolymers or copolymers obtained by oxidative polymerization of at least one compound described by general formula (I)

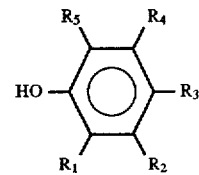

wherein each $R_1$, $R_2$, $R_3$, $R_4$, and $R_5$ is independently selected from among hydrogen atoms, halogen atoms, hydrocarbon groups, or substituted hydrocarbon groups (for example, halogenohydrocarbon groups).

Specific examples of the polymers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dimethoxy-1,4-phenylene) ether, poly(2,6-dichloromethyl-1,4-phenylene) ether, poly($^{2,6}$-dibromomethyl-1,4-phenylene) ether, poly(2,6-diphenyl-1,4-phenylene) ether, poly(2,6-ditrityl-1,4-phenylene) ether, poly(2,6-dichloro-1,4-phenylene) ether, poly(2,6-dibenzyl-1,4-phenylene) ether, and poly(2,5-dimethyl-1,4-phenylene ether. An especially preferred PPE resin is poly(2,6-dimethyl-1,4-phenylene) ether. An example of the polyphenylene ether copolymer is a copolymer containing some amount of an alkyl-3-substituted phenol, for example, 2,3,6-trimethylphenol, in the above-described polyphenylene ether repeating unit Copolymers in which styrene is grafted to these polyphenylene ethers may also be used. Examples of polyphenylene ethers with grafted styrene compounds include copolymers obtained by graft-polymerizing styrene, α-methylstyrene, vinyltoluene, chlorostyrene, or the like to the above-described polyphenylene ethers.

It is preferred that the PPE resins used in the invention have an intrinsic viscosity of 0.15 to 0.65 dL/g when measured at 30° C. in a chloroform solvent, 0.30 to 0.60 dL/g being especially preferred. Compositions obtained from resins with an intrinsic viscosity of less than 0.15 dL/g tend to be brittle and have poor mechanical strength. PPE resins with an intrinsic viscosity exceeding 0.65 dL/g have too great a difference in viscosity with thermoplastic polyester and tend not to disperse well.

The thermoplastic polyester resins used in the invention, which are known in the art, are polymers with ester linkages in the main chain of the molecule. Specific examples of them are polycondensed polyesters obtained by reacting dicarboxylic acid or a derivative thereof with a diol; polycondensed polyesters obtained by reacting dicarboxylic acid or a derivative thereof with a cyclic ether compound; polycondensed polyesters obtained by reacting a metal salt of dicarboxylic acid with a dihalide compound; and polycondensed polyesters obtained by ring-opening polymerization of a cyclic ester compound.

Aliphatic or aromatic forms of dicarboxylic acid can be used. Examples of aliphatic dicarboxylic acids include unsaturated fatty acids such as oxalic acid, succinic acid, and adipic acid. Alicyclic dicarboxylic acids such as cyclohexanedicarboxylic acid can also be used. Examples of aromatic dicarboxylic acids include terephthalic acid, isophthalic acid, phthalic acid, and chlorophthalic acid. These acids may be used singly or in combinations of two or more. Aromatic dicarboxylic acids are preferred, with terephthalic acid, isophthalic acid, and phthalic acid being especially preferred.

Examples of metal salts of dicarboxylic acids are alkali metal salts of the abovementioned dicarboxylic acids.

What is meant here by a derivative of a dicarboxylic acid is an anhydride, ester, salt, or similar derivative of a dicarboxylic acid.

Aliphatic or aromatic diols may be used as the diol. Examples of aliphatic diols include dihydric alcohols such as ethylene glycol, propylene glycol, butane-1,4-diol, and hexamethylene glycol, with ethylene glycol or butane-1,4-diol being especially preferred. Examples of aromatic diols include bisphenol A and resorcinol. The diols may be used singly or in combinations of two or more.

Examples of cyclic ether compounds include ethylene oxide and propylene oxide.

The above-described diols in which two of the hydroxy groups have been substituted with halogens, for example, chlorine or bromine, can be used as dihalide compounds.

ε-caprolactone or the like can be used as the cyclic ester compound.

The thermoplastic polyester resin used in the invention can be manufactured by any conventional method, using any of the above-mentioned raw materials. The preferred intrinsic viscosity, as an index of molecular weight, at least 0.50, at least 0.55 being especially preferred, when measured at 30° C. in a 1:1 mixture (by weight) of the solvents phenol and tetrachloroethane. If the intrinsic viscosity of the thermoplastic polyester is less than 0.50, it is difficult to obtain molded articles having good mechanical properties from a melt-kneaded blend of polyester resin and PPE resin.

The PPE resin (A) and thermoplastic polyester resin (B) are blended in amounts by weight of 5 to 90 parts of (A) per 95 to 10 parts of (B), preferably 20 to 50 parts of (A) per 80 to 50 parts of (B). If too much (A) is used, the resin composition will have poor moldability and solvent resistance, and if too much (B) is used, the composition will have poor dimensional stability and a low heat deflection temperature under loading.

Component (C) in the resin composition of the invention is a compound simultaneously having (a) residues of compounds selected from among maleic acid esters, maleimide, maleinamic acid esters, and derivatives thereof and (b) residues of compounds selected from among oxazoline, oxazine, oxazolone, oxazinone, and derivatives thereof.

The group (a) residues are discussed first. Residues of maleic acid esters or their derivatives are described by, for example, formula (i), hereinbelow

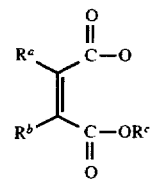

wherein each $R^a$ and $R^b$ is independently selected from the group consisting of hydrogen atoms, alkyl groups containing one to 20 carbon atoms, and aryl groups containing six to 14 carbon atoms, and $R^c$ is selected from the group consisting of alkyl groups containing one to 20 carbon atoms and aryl groups containing six to 14 carbon atoms.

Residues of maleimide and its derivatives are described by, for example, formula (ii), hereinbelow

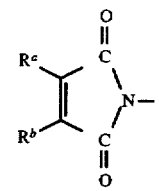

where each $R^d$ and $R^e$ is independently selected from the group consisting of hydrogen atoms, alkyl groups containing one to 20 carbon atoms, and aryl groups containing six to 14 carbon atoms.

Residues of maleinamic acid esters and their derivatives are described by, for example, formula (iii), hereinbelow

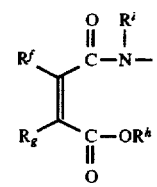

wherein each $R^f$, $R^g$, and $R^i$ is independently selected from the group consisting of hydrogen atoms, alkyl groups containing one to 20 carbon atoms, and aryl groups containing six to 14 carbon atoms, and $R^h$ is selected from among the group consisting of alkyl groups containing one to 20 carbon atoms and aryl groups containing six to 14 carbon atoms.

The alkyl groups containing one to 20 carbon atoms referred to here may be straight-chain or branched. It is preferred that the alkyl groups contain one to three carbon atoms. Preferred examples of alkyl groups include methyl, ethyl, and propyl groups.

Specific preferred examples of aryl groups containing six to 14 carbon atoms include phenyl groups, benzyl groups, tolyl groups, xylyl groups, and trityl groups.

It is preferred to select $R^a$ and $R^b$ in formula (i), hereinabove, from among hydrogen atoms, methyl groups, and ethyl groups and $R^c$ from among methyl groups and ethyl groups.

It is preferred to select $R^d$ and $R^e$ in formula (ii), hereinabove, from among hydrogen atoms, methyl groups, and ethyl groups.

It is preferred to select $R^f$, $R^g$, and $R^i$ in formula (iii), hereinabove, from among hydrogen atoms, methyl groups, and ethyl groups and $R^h$ from among methyl groups and ethyl groups.

The group (b) residues are discussed hereinbelow. Oxazoline, oxazine, oxazolone, oxazinone, and their derivatives may have free valance at any position. These compounds have at least two possible resonance structures, and they may have any structure in the invention. Preferred residues of oxazoline and its derivatives are described by, for example, formula (iv), hereinbelow

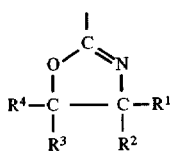

wherein each $R^1$, $R^2$, $R^3$, and $R^4$ is independently selected from among the group consisting of hydrogen atoms, alkyl groups containing one to 20 carbon atoms, and aryl groups containing six to 14 carbon atoms.

The oxygen, nitrogen, and carbon atoms in the oxazines may occupy any position, and the oxazines may be orthooxazine, metoxazine, and para-oxazine. A preferred residue of oxazines and their derivatives is metoxazine described by, for example, formula (v), hereinbelow

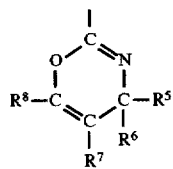

wherein each $R^5$, $R^6$, $R^7$, and $R^8$ is independently selected from the group consisting of hydrogen atoms, alkyl groups containing one to 20 carbon atoms, and aryl groups containing six to 14 carbon atoms. Preferred residues of oxazilone and its derivatives are described by, for example, formula (vi) hereinbelow

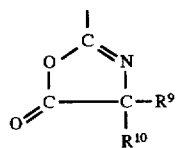

wherein each $R^9$ and $R^{10}$ is independently selected from the group consisting of hydrogen atoms, alkyl groups containing one to 20 carbon atoms, and aryl groups containing six to 14 carbon atoms.

Preferred residues of oxazinone and its derivatives are described by, for example, formula (vii), hereinbelow

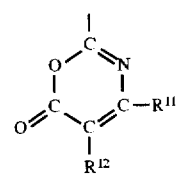

wherein each $R^{11}$ and $R^{12}$ is independently selected from the group consisting of hydrogen atoms, alkyl groups containing one to 20 carbon atoms, and aryl groups containing six to 14 carbon atoms.

The alkyl groups containing one to 20 carbon atoms referred to here may be straight-chain or branched. It is preferred that the alkyl groups contain one to three carbon atoms. Preferred examples of alkyl groups include methyl, ethyl, and propyl groups.

Specific preferred examples of aryl groups containing six to 14 carbon atoms include phenyl groups, benzyl groups, tolyl groups, xylyl groups, and trityl groups.

It is preferred that $R^1$ to $R^4$ in formula (iv), hereinabove, be selected from among hydrogen atoms, methyl groups, and ethyl groups.

It is preferred that $R^5$ to $R^8$ in formula (v), hereinabove, be selected from among hydrogen atoms, methyl groups, and ethyl groups.

It is preferred that $R^9$ and $R^{10}$ in formula (vi), hereinabove, be selected from among hydrogen atoms, methyl groups, and ethyl groups.

It is preferred that $R^{11}$ and $R^{12}$ in formula (vii), hereinabove, be selected from among hydrogen atoms, methyl groups, and ethyl groups.

Component (C) may contain any combination of one or more residues each from group (a) and group (b). Preferred examples of the compound designated component (C) include 2-ricinol-2-oxazoline maleate described by the following formula

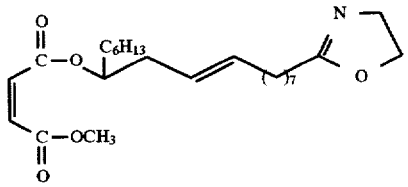

These compounds may be used singly or in combinations of two or more. 2-Ricinol-2-oxazoline maleate is preferred.

Examples of methods for preparing component (C) can be found in European Patent Application No. 315,856 (1989), European Patent Application No. 394,854 (1990), and H. Moellard et al. Fat Sci. Tchnol. 95 (1993) 2, p 51–57.

Component (C) is used in amounts, by weight, of at least 0.01 parts, preferably at least 0.5 parts, and no more than 30 parts, preferably no more than 10 parts, per 100 parts total of (A) and (B). If (C) is used in too small amounts, it does not compatibilize (A) and (B); if it is used in too large amounts, mechanical and thermal properties are compromised.

Examples of component (D), an organic peroxide with a half-life of 1 min at 100° C. to 270° C., include diallylperoxydicarbonate, t-butyl peroxyallylcarbonate, 2,5-dimethyl-2,5-di(peroxybenzoyl)hexene-3, 2,5-dimethyl-2, 5-di(peroxybenzoyl)hexene-3, 2,5-dimethyl-2,5-di(t-butylperoxy)hexene-3, 2,5-dimethyl-2,5-di(t-butylperoxy) hexene-3, t-butylperoxyisopropylene carbonate, 1,1,3,3- tetramethylperhydroxybutylene-3, 1,1,3,3-tetramethylperhydroxypentene-4, 2,2-bis(t-butylperoxy)octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene. They may be used singly or in combinations of two or more.

Preferably, component (D) is selected from among 1,3-bis(t-butylperoxyisopropyl)benzene, t-butyl cumylperoxide, dicumyl peroxide, and 2,5-dimethyl-2,5-d(t-butylperoxy)hexene-3.

It is preferred to blend component (D) in amounts, by weight, of at least 0.01 parts, preferably at least 0.05 parts, and no more than 3 parts, preferably no more than 1 part, per total 100 parts of the above-mentioned (A) and (B). If there is too little (D), (A) and (B) are not compatibilized, and if there is too much (D), the mechanical and thermal properties of the composition are compromised.

Other conventional additives may be added, as desired, to the resin composition of the invention when the resin is mixed or molded, provided that the properties of the composition are not compromised. Examples include coloring agents (pigments and dies), reinforcing agents (glass fibers, carbon fibers, etc.), fillers (carbon black, silica, titanium oxide, etc.) agents for imparting heat resistance, antioxidants, antiweathering agents, lubricants, parting agents, crystal-nucleating agents, plasticizers, flame retardants, flowability enhancers, impact resistance enhancers, and antistatic agents.

There are no particular restrictions on the manufacturing method for the resin composition of the invention; conventional methods are satisfactory. However, a melt-mix method is generally preferred. Small amounts of solvent may be used, but they are generally not necessary. Examples of equipment that may be used include Banbury mixers, rolls, and kneaders, which may be used in a batchwise or continuous manner. There are no particular restrictions on the mixing order for the components.

Component (C)

C-1: 2-Ricinol-2-oxazoline maleate (VEP8-5515, made by Henkle Shiramizu K.K.)

C-2 (Used in the comparative examples): 2-Ricinol-2-oxazoline (VEP8513, made by Henkle Shiramizu K.K.)

Component (D)

P-14: 1,3-Bis(t-butylperoxyisopropyl)benzene with a half-life of 1 min at 183° C. Trade name Percadox 14, made by Kayaku Akuzo K.K.

(1) Izod Impact Strength

Izod impact strength was measured in accordance with ASTM D256, using unnotched $^1\!/\!_8$-inch test specimens.

(2) Tensile Strength and Tensile Elongation

Measured in accordance with ASTM D638, using ASTM No. 4 dumbbells.

(3) Flexural Strength and Flexural Modulus

Measured in accordance with ASTM D790, using ¼-inch thick test specimens.

(4) Heat Deflection Temperature (HDT)

Measured in accordance with ASTM D648, using ¼-inch thick test specimens.

(5) Melt Index (MI)

Measured in accordance with ASTM D1238 at 250° C. under a load of 10 kg.

(6) Morphology

Morphology was observed by scanning electron microscopy (SEM, magnification: 1,000 ×). The PPE particles dispersed in the composition were classified as being one of three sizes: fine (<2 mm), intermediate (2–4 mm), and large (>4 mm).

Working Examples 1–6 and Comparative Examples 1–4

The components in Table 1 were melt-kneaded for 5 min in the amounts shown (parts by weight), using a Brabender at a temperature setting of 260° C. Morphology was observed by scanning electron microscopy (SEM, magnification: 1,000×). The PPE particles dispersed in the composition were classified as being one of three sizes: fine (<2 mm), intermediate (2–4 mm), and large (>4 mm). The results are shown in Table 1.

TABLE 1

| Components (Parts by Weight) | Working Examples | | | | | | Comparative Examples | | | |
|---|---|---|---|---|---|---|---|---|---|---|
| | 1 | 2 | 3 | 4 | 5 | 6 | 1 | 2 | 3 | 4 |
| (A)PPE | 30 | 30 | 30 | 30 | 30 | 30 | 30 | 30 | 30 | 30 |
| (B)PBT | 70 | 70 | 70 | 70 | 70 | 70 | 70 | 70 | 70 | 70 |
| (C)C-1 | 2 | 1.5 | 3 | 4.5 | 2 | 2 | 0 | 1.5 | 0 | 0 |
| C-2 | 0 | 0 | 0 | 0 | 0 | 0 | 0 | 0 | 0 | 2 |
| (D)P-14 | 0.2 | 0.15 | 0.3 | 0.45 | 0.1 | 0.4 | 0 | 0 | 0.2 | 0.2 |
| Particle size of dispersed PPE | Fine | Intermediate | Fine | Fine | Intermediate | Fine | Large | Large | Large | Large |

EXAMPLES

The present invention is described in further detail hereinbelow by means of working examples. The following compounds were used in the working and comparative examples.

Component (A)

PPE: Poly(2,6-dimethyl-1,4-phenylene) ether with an intrinsic viscosity of 0.46 dL/g (chloroform, 30° C.), made by G.E. Plastics Japan, Ltd.

Component (B)

Polyester: Poly(butylene terephthalate) (PBT), trade name VALOX 315, made by G.E. Plastics Japan, Ltd.

Working Example 7 and Comparative Example 5

Pellets were made by extruding the components in Table 2 in the amounts shown (parts by weight) with a vented twin screw extruder at a temperature setting of 260° C. and screw speed of 300 rpm. The pellets were injection-molded with an injection molder at a cylinder temperature of 260° C. and mold temperature of 60° C. and then subjected to the following battery of tests. The results are shown in Table 2.

TABLE 2

| Components (Parts by Weight) | Working Example 7 | Comparative Example 5 |
|---|---|---|
| (A) PPE | 30 | 30 |
| (B) PBT | 70 | 70 |
| (C) C-1 | 2 | 0 |
| (D) P-14 | 0.2 | 0 |
| Evaluative Tests | | |
| Izod impact strength (Kg × cm/cm) | 39 | 15 |
| Tensile strength (Kg/cm$^2$) | 465 | 340 |
| Tensile elongation (%) | 5 | 4 |
| Flexural strength (Kg/cm$^2$) | 870 | 580 |
| Flexural modulus (Kg/cm$^2$) | 24,800 | 24,600 |
| Heat deflection temperature (°C.) | 174 | 187 |
| MI (g/10 min) | 35 | 24 |
| Morphology | | |
| Particle size of dispersed PPE | Fine | Large |

Scanning electron microscopy revealed extremely good compatibility between the PPE and FBT in moldings of the composition of the invention, and the moldings therefore have excellent mechanical strength.

What is claimed:

1. A resin composition comprising:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises a residue of the formula

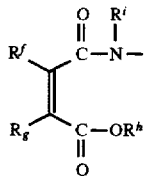

wherein each $R^f$, $R^g$, and $R^i$ is independently selected from the group consisting of hydrogen atoms, alkyl groups containing one to 20 carbon atoms, and aryl groups containing six to 14 carbon atoms, and $R^h$ is a selected from among the group consisting of alkyl groups containing one to 20 carbon atoms and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

2. The resin composition of claim 1, wherein each $R^f$, $R^g$, and $R^i$ is independently selected from the group consisting of hydrogen atoms, methyl groups, and ethyl groups and $R^h$ are selected from the group consisting of methyl groups and ethyl groups.

3. The resin composition of claim 1, wherein component (D) is at least one organic peroxide selected from the group consisting of: diallylperoxydicarbonate, t-butyl peroxyallylcarbonate, 2,5-dimethyl-2,5-di(peroxybenzoyl) hexene-3, 2,5-dimethyl-2, 5-di(peroxybenzoyl)hexene-3, 2,5-dimethyl-2,5-di(t-butylperoxy)hexene-3, 2,5-dimethyl-2,5-di(t-butylperoxy)hexene-3, t-butylperoxyisopropylene carbonate, 1,1,3,3-tetramethylperhydroxybutylene-3, 1,1,3, 3-tetramethylperhydroxypentene-4, 2,2-bis(t-butylperoxy) octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene.

4. The resin composition of claim 3, wherein component (D) is selected from the group consisting of 1,3-bis(t-butylperoxyisopropyl)benzene, t-butyl cumylperoxide, dicumyl peroxide, and 2,5-dimethyl-2,5-d(t-butylperoxy) hexyne-3.

5. A resin composition comprising:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises a residue of the formula

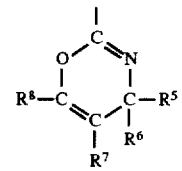

wherein each $R^5$, $R^6$, $R^7$, and $R^8$ is independently selected from the group consisting of hydrogen atoms, alkyl groups containing one to 20 carbon atoms, and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

6. The resin composition of claim 5, wherein each $R^5$ to $R^8$ is independently selected from the group consisting of hydrogen atoms, methyl groups, and ethyl groups.

7. The resin composition of claim 5, wherein component (D) is at least one organic peroxide selected from the group consisting of: diallylperoxydicarbonate, t-butyl peroxyallylcarbonate, 2,5-dimethyl-2,5-di(peroxybenzoyl) hexene-3, 2,5-dimethyl-2, 5-di(peroxybenzoyl)hexyne-3, 2,5-dimethyl-2,5-di(t-butylperoxy)hexene-3, 2, 5-dimethyl-2,5-di(t-butylperoxy)hexyne-3, t-butylperoxyisopropylene carbonate, 1,1,3,3-tetramethylperhydroxybutylene-3, 1,1,3, 3-tetramethylperhydroxypentene-4, 2,2-bis(t-butylperoxy) octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene.

8. The resin composition of claim 7, wherein component (D) is selected from the group consisting of 1,3-bis(t-butylperoxyisopropyl)benzene, t-butyl cumylperoxide, dicumyl peroxide, and 2,5-dimethyl-2,5-d(t-butylperoxy)hexyne-3.

9. A resin composition comprising:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises a residue of the formula

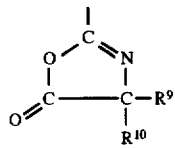

wherein each $R^9$ and $R^{10}$ is independently selected from the group consisting of hydrogen atoms, alkyl groups containing one to 20 carbon atoms, and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

10. The resin composition of claim 9, wherein each $R^9$ and $R^{10}$ is independently selected from the group consisting of hydrogen atoms, methyl groups, and ethyl groups.

11. The resin composition of claim 9, wherein component (D) is at least one organic peroxide selected from the group consisting of: diallylperoxydicarbonate, t-butyl peroxyallylcarbonate, 2,5-dimethyl-2,5-di(peroxybenzoyl)hexene-3, 2,5-dimethyl-2, 5-di(peroxybenzoyl)hexyne-3, 2,5-dimethyl-2,5-di(t-butylperoxy)hexene-3, 2, 5-dimethyl-2,5-di(t-butylperoxy)hexyne-3, t-butylperoxyisopropylene carbonate, 1,1,3,3-tetramethylperhydroxybutylene-3, 1,1,3, 3-tetramethylperhydroxypentene-4, 2,2-bis(t-butylperoxy)octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene.

12. The resin composition of claim 11, wherein component (D) is selected from the group consisting of 1,3-bis(t-butylperoxyisopropyl)benzene, t-butyl cumylperoxide, dicumyl peroxide, and 2,5-dimethyl-2,5-d(t-butylperoxy)hexyne-3.

13. A resin composition comprising:

(A) 5 to 90 percent by weight of a polyphenylene ether resin:

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises a residue of the formula

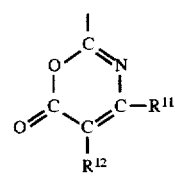

wherein each $R^{11}$ and $R^{12}$ is independently selected from the group consisting of hydrogen atoms, alkyl groups containing one to 20 carbon atoms, and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

14. The resin composition of claim 13, wherein each $R^{11}$ and $R^{12}$ is independently selected from the group consisting of hydrogen atoms, methyl groups, and ethyl groups.

15. The resin composition of claim 13, wherein component (D) is at least one organic peroxide selected from the group consisting of: diallylperoxydicarbonate, t-butyl peroxyallylcarbonate, 2,5-dimethyl-2,5-di(peroxybenzoyl)hexene-3, 2,5-dimethyl-2, 5-di(peroxybenzoyl)hexyne-3, 2,5-dimethyl-2,5-di(t-butylperoxy) hexene-3, 2,5-dimethyl-2,5-di(t-butylperoxy)hexyne-3, t-butylperoxyisopropylene carbonate, 1,1,3,3-tetramethylperhydroxybutylene-3, 1,1,3, 3-tetramethylperhydroxypentene-4, 2,2-bis(t-butylperoxy)octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene.

16. The resin composition of claim 15, wherein component (D) is selected from the group consisting of 1,3-bis(t-butylperoxyisopropyl)benzene, t-butyl cumylperoxide, dicumyl peroxide, and 2,5-dimethyl-2,5-d(t-butylperoxy)hexyne-3.

17. A resin composition comprising:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound of the formula

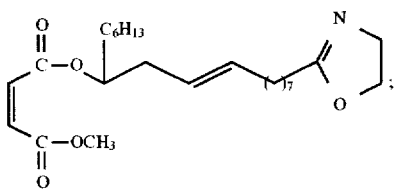

and (D) 0.01 to 3 parts by weight, per 100 parts by weight of (A) and (B), of an organic peroxide which has a half life of one minute at temperatures ranging from 100° to 270° C.

18. The resin composition of claim 17, wherein component (D) is at least one organic peroxide selected from the group consisting of: diallylperoxydicarbonate, t-butyl peroxyallylcarbonate, 2,5-dimethyl-2,5-di(peroxybenzoyl) hexene-3, 2,5-dimethyl-2,5-di(peroxybenzoyl) hexyne-3, 2,5-dimethyl-2,5-di(t-butylperoxy)hexene-3, 2,5-dimethyl-2,5-di(t-butylperoxy) hexyne-3, t-butylperoxyisopropylene carbonate, 1,1,3,3-tetramethylperhydroxybutylene-3, 1,1,3,3-tetramethylperhydroxypentene-4, 2,2-bis(t-butylperoxy) octene-1, 2,2-bis(t-butylperoxy)heptene-1, methyl ethyl ketone peroxide, cyclohexanone peroxide, 2,2-bis(t-butylperoxy)octane, 2,2-bis(t-butylperoxy)butane, cumene hydroperoxide, di-t-butyl peroxide, dicumyl peroxide, t-butyl cumylperoxide, t-butyl peroxylaurate, and 1,3-bis(t-butylperoxyisopropyl)benzene.

19. The resin composition of claim 18, wherein component (D) is selected from the group consisting of 1,3-bis(t-butylperoxyisopropyl)benzene, t-butyl cumylperoxide, dicumyl peroxide, and 2,5-dimethyl-2,5-d(t-butylperoxy) hexyne-3.

20. A resin composition consisting essentially of:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises at least one residue of the group consisting of the formulas:

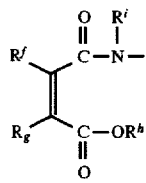

wherein each $R^f$, $R^g$, and $R^i$ is independently selected from the group consisting of hydrogen atoms, alkyl groups containing one to 20 carbon atoms, and aryl groups containing six to 14 carbon atoms, and $R^h$ is selected from among the group consisting of alkyl groups containing one to 20 carbon atoms and aryl groups containing six to 14 carbon atoms;

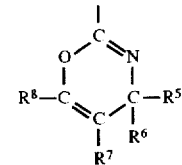

wherein each $R^5$, $R^6$, $R^7$, and $R^8$ is independently selected from the group consisting of hydrogen atoms, alkyl groups containing one to 20 carbon atoms, and aryl groups containing six to 14 carbon atoms;

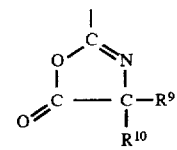

wherein each $R^9$ and $R^{10}$ is independently selected from the group consisting of hydrogen atoms, alkyl groups containing one to 20 carbon atoms, and aryl groups containing six to 14 carbon atoms; and

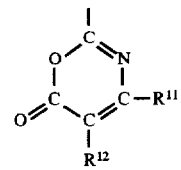

wherein each $R^{11}$ and $R^{12}$ is independently selected from the group consisting of hydrogen atoms, alkyl groups containing one to 20 carbon atoms, and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

21. A resin composition made by melt-mixing:

(A) 5 to 90 percent by weight of a polyphenylene ether resin;

(B) 95 to 10 percent by weight of a thermoplastic polyester resin;

(C) 0.01 to 30 parts by weight, per 100 parts by weight of (A) and (B), of a compound comprising:

(a) a residue of a compound selected from the group consisting of maleic acid esters, maleimide, maleinamic acid esters, and derivatives thereof, and (b) a residue of a compound selected from the group consisting of oxazoline, oxazine, oxazolone, oxazinone, and derivatives thereof;

wherein component (C) comprises at least one residue of the group consisting of the formulas:

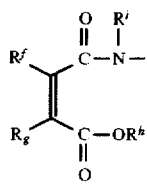

wherein each $R^f$, $R^g$, and $R^i$ is independently selected from the group consisting of hydrogen atoms, alkyl groups containing one to 20 carbon atoms, and aryl groups containing six to 14 carbon atoms, and $R^h$ is selected from among the group consisting of alkyl groups containing one to 20 carbon atoms and aryl groups containing six to 14 carbon atoms;

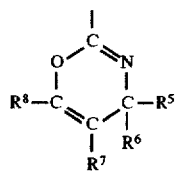

wherein each $R^5$, $R^6$, $R^7$, and $R^8$ is independently selected from the group consisting of hydrogen atoms, alkyl groups containing one to 20 carbon atoms, and aryl groups containing six to 14 carbon atoms;

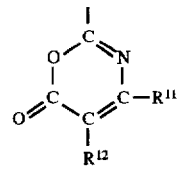

wherein each $R^9$ and $R^{10}$ is independently selected from the group consisting of hydrogen atoms, alkyl groups containing one to 20 carbon atoms, and aryl groups containing six to 14 carbon atoms; and wherein each $R^{11}$ and $R^{12}$ is independently selected from the group consisting of hydrogen atoms, alkyl groups containing one to 20 carbon atoms, and aryl groups containing six to 14 carbon atoms; and (D) 0.01 to 3 parts by weight, per 100 parts by weight of (A) and (B), of an organic peroxide which has a half life of one minute at temperatures ranging from 100° to 270° C.

* * * * *